United States Patent
Brown

(10) Patent No.: US 11,821,742 B2
(45) Date of Patent: Nov. 21, 2023

(54) TRAVEL BASED NOTIFICATIONS

(71) Applicant: Snap Inc., Santa Monica, CA (US)

(72) Inventor: Thomas Kay Brown, Highland, UT (US)

(73) Assignee: Snap Inc., Santa Monica, CA (US)

( * ) Notice: Subject to any disclaimer, the term of this patent is extended or adjusted under 35 U.S.C. 154(b) by 643 days.

(21) Appl. No.: 16/584,444

(22) Filed: Sep. 26, 2019

(65) Prior Publication Data
US 2021/0095986 A1 Apr. 1, 2021

(51) Int. Cl.
| | |
|---|---|
| *G01C 21/34* | (2006.01) |
| *G06N 20/00* | (2019.01) |
| *G06Q 30/0251* | (2023.01) |
| *H04W 4/12* | (2009.01) |
| *H04W 4/23* | (2018.01) |

(Continued)

(52) U.S. Cl.
CPC ..... *G01C 21/3476* (2013.01); *G01C 21/3423* (2013.01); *G01C 21/3484* (2013.01); *G06N 20/00* (2019.01); *G06Q 30/0261* (2013.01); *H04W 4/12* (2013.01); *H04W 4/021* (2013.01); *H04W 4/23* (2018.02); *H04W 4/42* (2018.02)

(58) Field of Classification Search
CPC ... G06F 16/9535; H04L 67/26; H04W 64/006
See application file for complete search history.

(56) References Cited

U.S. PATENT DOCUMENTS

| | | | |
|---|---|---|---|
| 666,223 | A | 1/1901 | Shedlock |
| 4,581,634 | A | 4/1986 | Williams |
| 4,975,690 | A | 12/1990 | Torres |

(Continued)

FOREIGN PATENT DOCUMENTS

| | | |
|---|---|---|
| CA | 2887596 A1 | 7/2015 |
| CN | 114424230 A | 4/2022 |

(Continued)

OTHER PUBLICATIONS

"International Application Serial No. PCT/US2020/070574, International Search Report dated Nov. 12, 2020", 4 pgs.

(Continued)

*Primary Examiner* — Jeff A Burke
*Assistant Examiner* — Jerrod Irvin Davis
(74) *Attorney, Agent, or Firm* — Schwegman Lundberg & Woessner, P.A.

(57) ABSTRACT

Systems and methods are provided for performing operations comprising: establishing a plurality of geofences each associated with a respective point of interest; determining a current location of a user and a current time; applying a trained machine learning model to the current location and the current time to predict a given geofence of the plurality of geofences that will be traversed by the user at a future time, the machine learning model being trained to establish a relationship between travel times and paths of the user and a set of geofences of the plurality of geofences that is traversed by the paths during the travel times; retrieving the point of interest associated with the predicted given geofence; and automatically generating a notification relating to the retrieved point of interest for presentation to the user before the user traverses the given geofence associated with the retrieved point of interest.

20 Claims, 10 Drawing Sheets

(51) Int. Cl.
  *H04W 4/42*    (2018.01)
  *H04W 4/021*   (2018.01)

(56) References Cited

U.S. PATENT DOCUMENTS

| | | |
|---|---|---|
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Ben Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi et al. |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz et al. |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |

(56) References Cited

U.S. PATENT DOCUMENTS

| | | |
|---|---|---|
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 10,349,208 B1 * | 7/2019 | Liang .................... G06N 20/00 |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschwieler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay et al. |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |

(56) References Cited

U.S. PATENT DOCUMENTS

| | | |
|---|---|---|
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238476 A1* | 9/2011 | Carr ..................... G06Q 30/00 705/14.1 |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf et al. |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |

(56) References Cited

U.S. PATENT DOCUMENTS

| | | |
|---|---|---|
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0253833 A1* | 9/2013 | Tuukkanen ......... G06F 3/04847 701/538 |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0039792 A1* | 2/2014 | Seetharam ........ G01C 21/3697 701/538 |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0257949 A1* | 9/2014 | Gishen ............... G06Q 30/0252 705/14.5 |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0149226 A1* | 5/2015 | Horstemeyer ..... G06Q 30/0257 705/7.13 |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0148267 A1* | 5/2016 | Pittman ................. G08G 1/095 705/14.53 |
| 2016/0180887 A1 | 6/2016 | Sehn |
| 2016/0182422 A1 | 6/2016 | Sehn et al. |
| 2016/0182875 A1 | 6/2016 | Sehn |
| 2016/0225072 A1* | 8/2016 | Brady .................... G07C 5/008 |
| 2016/0239248 A1 | 8/2016 | Sehn |
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0287006 A1 | 10/2017 | Azmoodeh et al. |
| 2018/0014155 A1* | 1/2018 | Wang ................. H04W 64/003 |
| 2018/0121956 A1* | 5/2018 | DeLuca ............... H04W 4/021 |
| 2018/0196492 A1* | 7/2018 | Vaccari ............... G06F 16/951 |
| 2018/0372503 A1* | 12/2018 | Bagchi ............... G01C 21/3492 |
| 2019/0098443 A1* | 3/2019 | DeLuca ............... G06F 16/27 |
| 2019/0098448 A1 | 3/2019 | Jain et al. |

(56) References Cited

U.S. PATENT DOCUMENTS

2019/0110160 A1* 4/2019 Barrand ............... H04W 68/02
2020/0400446 A1* 12/2020 Beaurepaire ....... G01C 21/3415

FOREIGN PATENT DOCUMENTS

| EP | 2051480 A1 | 4/2009 |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |
| WO | WO-2021062439 A1 | 4/2021 |

OTHER PUBLICATIONS

"International Application Serial No. PCT/US2020/070574, Written Opinion dated Nov. 12, 2020", 7 pgs.
"A Whole New Story", Snap, Inc., [Online] Retrieved from the Internet: <URL: https://www.snap.com/en-US/news/>, (2017), 13 pgs.
"Adding photos to your listing", eBay, [Online] Retrieved from the Internet: <URL: http://pages.ebay.com/help/sell/pictures.html>, (accessed May 24, 2017), 4 pgs.
"BlogStomp", StompSoftware, [Online] Retrieved from the Internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report dated Sep. 29, 2015", 2 pgs.
"International Application Serial No. PCT/US2020/070574, International Preliminary Report on Patentability dated Apr. 7, 2022", 9 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.
"European Application Serial No. 20789420.5, Response to Communication Pursuant to Rules 161 and 162 EPC filed Oct. 20, 2022", 11 pgs.

* cited by examiner

TRAVEL BASED NOTIFICATIONS

TECHNICAL FIELD

The present disclosure relates generally to providing advertisements to a user relative to the user's location.

BACKGROUND

Advertising systems can be used to recommend products and services to users. Such systems typically leverage information known generally about the user including the user's geographical location to tailor advertisements being served to the user. Users continue to carry devices that can be used to determine the user's location and improve the advertisement selection process.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
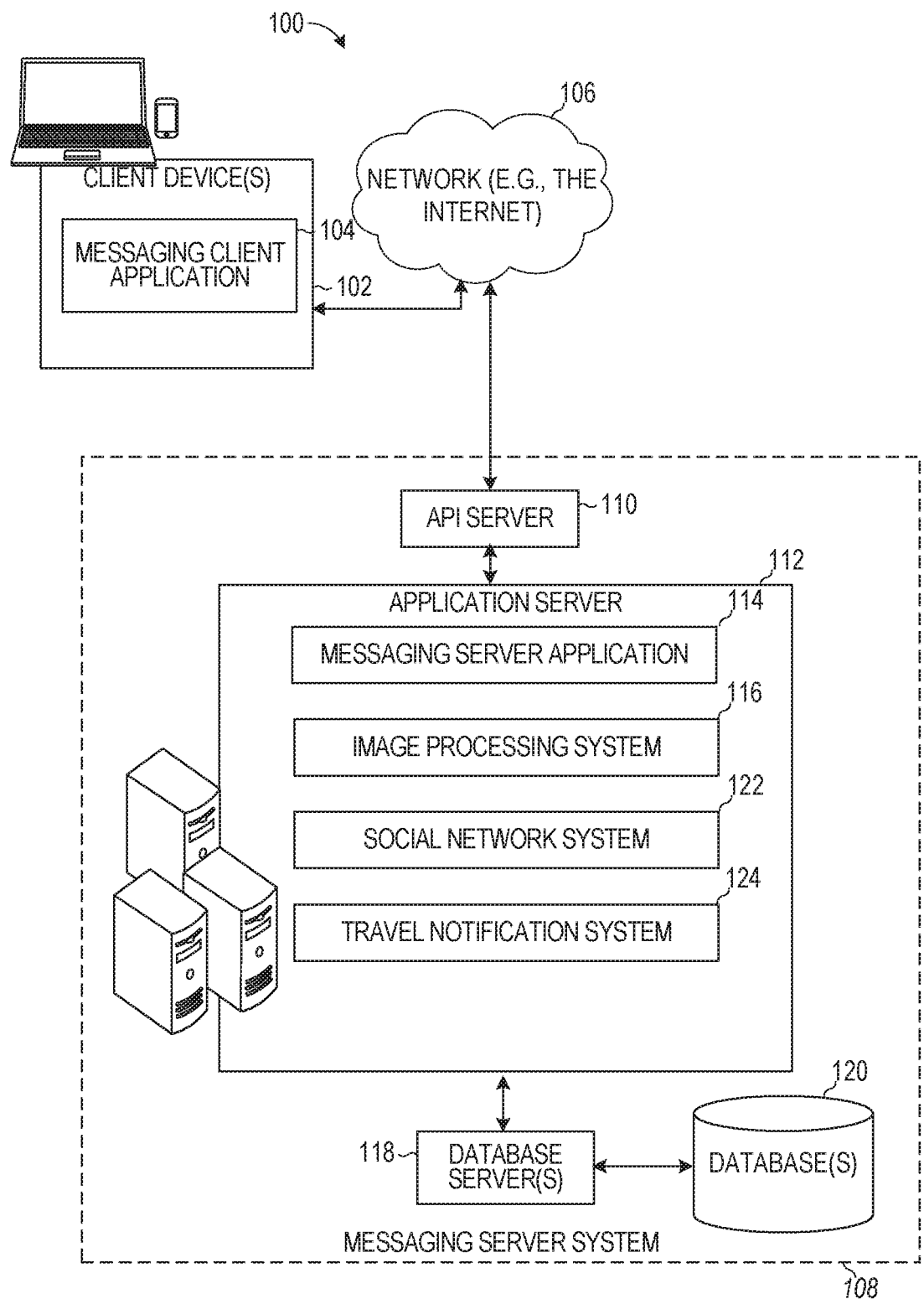
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, advertising systems serve advertisements to users based on information generally known about the users and the user's current geographical location. For example, if the user lives in a particular city, the advertisement systems informs the user about products and services available in the user's city. The advertisements are generally served to users at predetermined intervals or when the user is consuming some content on their device and are not always relevant to what the user is currently doing. As such, the user has to remember the product or service being advertised at some later time when the advertised product or service becomes relevant. As a result, the overall effect of the advertisements served by the typical systems is reduced and can be considered a distraction to the users, which ends up wasting the users' time and resources.

The disclosed embodiments improve the efficiency of using the electronic device by applying machine learning techniques to learn user behavior to serve relevant advertisements to a user at a particular point in time prior to the user reaching a predetermined geofence at a future time. Specifically, the disclosed embodiments establish a plurality of geofences each associated with a respective point of interest and determining a current location of a first user and a current time. The disclosed embodiments include applying a trained machine learning model to the current location and the current time to predict a given geofence of the plurality of geofences that will be traversed by the first user at a future time. The machine learning model is trained to establish a relationship between travel times and paths of at least the first user and a set of geofences of the plurality of geofences that is traversed by the paths during the travel times. The point of interest associated with the predicted given geofence is retrieved and a notification is automatically generated relating to the retrieved point of interest for presentation to the first user before the first user traverses the given geofence associated with the retrieved point of interest.

In some cases, the machine learning technique learns the time at which the first user normally leaves their home to go to work and the navigation path the user takes to get to work. The machine learning technique identifies various geofences along the navigation path that enclose one or more points of interest, such as a restaurant, an amusement park, a commercial establishment, a shopping mall, a sporting event venue, a park, a beach, a scenic area, or a movie theater. Prior to the user leaving for work in the future from their home, the disclosed embodiments select one of the geofences along the navigation paths and generate an advertisement for the point of interest enclosed by the selected geofence. The disclosed embodiments notify the user about the advertisement for the point of interest at a predetermined period of time, such as 5 minutes before the user leaves their home to go to work along the navigation path. Alternatively, the disclosed embodiments present the notification without receiving user input, such as by presenting a prompt or overlay on the user's device, while the user is traversing the navigation path to work but a threshold period of time (e.g., 5 minutes) before the user will reach the selected geofence. In this way, the advertisement served to the user is highly relevant and more likely to be effective in the user deciding to consume the product or services being advertised. This increases the overall efficiency and reduces processing requirements for serving advertisements to users and improves the overall advertising systems.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104. Each messaging client application 104 is communicatively coupled to other instances of the messaging client application 104, and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the travel notification system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends.

The application server 112 is communicatively coupled to a database server 118, which facilitates access to a database 120 in which is stored data associated with messages processed by the messaging server application 114.

The travel notification system 124 serves advertisements to one or more users based on their future destinations, locations, navigation paths, and/or modes of transportation. Specifically, the travel notification system 124 tracks and stores locations of each user of the messaging client application 104 and the times at which the users were at the various locations. In some cases, the travel notification system 124 requests express authorization from each of the users to track their current locations. The travel notification system 124 computes and/or forms paths between the locations based on how long the users spend at specific locations. For example, if a user was home for several hours (e.g., a first location) and then started traveling before reaching work and staying at work for several hours (e.g., a second location), the travel notification system 124 determines that the locations traversed between when the user was home and when the user reached work form a single navigation path. The travel notification system 124 identifies geofences traversed by each of the locations and/or paths that the users travel.

The travel notification system 124 trains a machine learning technique (model or algorithm) to establish a relationship between travel times and paths traversed by the users and the set of geofences traversed along those paths. In this way, the machine learning technique can predict which set of geofences will be traversed by the user when the user is in a particular location and/or is along one of the previously traversed navigation paths in the future. The travel notification system 124 selects an advertisement to serve to the users based on the points of interest that are within the predicted set of geofences. The travel notification system 124 can notify the user automatically about the points of interest using the selected advertisement just prior to the user starting to travel along the navigation path and/or while the user is traveling along the navigation path but before the user reaches the geofence enclosing the advertised point of interest.

For example, the travel notification system 124 learns the time at which the first user normally leaves their home to go to work and the navigation path the user takes to get to work. The travel notification system 124 identifies various geofences along the navigation path that enclose one or more points of interest, such as a restaurant, an amusement park, a commercial establishment, a shopping mall, a sporting event venue, a park, a beach, a scenic area, or a movie theater. Prior to the user leaving for work in the future from their home, the travel notification system 124 selects one of the geofences along the navigation paths and generates an advertisement for the point of interest enclosed by the selected geofence. The travel notification system 124 notifies the user about the advertisement for the point of interest at a predetermined period of time, such as 5 minutes before the user leaves their home to go to work along the navigation path. Alternatively, the travel notification system 124 presents the notification without receiving user input, such as by presenting a prompt or overlay on the user's device, while the user is traversing the navigation path to work but a threshold period of time (e.g., 5 minutes) before the user will reach the selected geofence. In this way, the advertisement served to the user is highly relevant and more likely to be effective in the user deciding to consume the product or services being advertised. This increases the overall efficiency and reduces processing requirements for serving advertisements to users and improves the overall advertising systems.

In some embodiments, the travel notification system 124 presents a graphical map-based user interface to a commercial entity for generating one or more geofences. Specifically, a restaurant owner may access the travel notification system 124 and, for a subscription fee or for a nominal or no fee, view a graphical map-based user interface. The travel notification system 124 receives input from the restaurant owner that draws a circle, rectangle, triangle, or other suitable shape around the restaurant owned by the restaurant owner. In an embodiment, the travel notification system 124 limits the restaurant owner to drawing a shape that is less than a threshold size (e.g., the shape is limited to covering less than 1 acre of land on the map). In some embodiments, the threshold size can be dynamically increased in response to the restaurant owner selecting an option that upgrades their access to the map-based graphical user interface. In some cases, the option to upgrade is presented to the restaurant owner for an increased fee.

After the restaurant owner draws the shape, the restaurant owner can input a name of the point of interest (e.g., the restaurant) and can supply an advertisement for the point of interest. In some cases, the restaurant owner can input various parameters for the advertisement for triggering different advertisement presentations to users depending on who the users are traveling with. For example, the restaurant owner can specify a first advertisement (with a first type of content) for the point of interest if the travel notification system 124 determines that the targeted user is traveling alone along a path that traverses the geofence drawn by the restaurant owner. As another example, the restaurant owner can specify a second advertisement (with a second type of content) for the same point of interest if the travel notification system 124 determines that the targeted user is traveling with a coworker along the path that traverses the geofence drawn by the restaurant owner. As another example, the restaurant owner can specify a second advertisement (with a third type of content) for the same point of interest if the travel notification system 124 determines that the targeted user is traveling with a family member (child and/or wife) along the path that traverses the geofence drawn by the restaurant owner. In some cases, the advertisement includes a recommendation for a product and/or a coupon for a product or service associated with the point of interest.

In some embodiments, the restaurant owner can specify among the parameters for triggering and selecting advertisements a mode of transportation being used to reach the point of interest. For example, the restaurant owner can specify a first advertisement for the point of interest if the travel notification system 124 determines that the targeted user is traveling by bicycle or non-motorized vehicle along a path that traverses the geofence drawn by the restaurant owner. As another example, the restaurant owner can specify a second advertisement for the same point of interest if the travel notification system 124 determines that the targeted user is traveling by car or train or motorized vehicle along the path that traverses the geofence drawn by the restaurant owner.

In some cases, the restaurant owner can require a specific mode of transportation for triggering a given advertisement. In this way, the travel notification system 124 can store associations between different points of interest within the same or different geofence with different modes of transportation. As an example, the travel notification system 124 can determine the current mode of transportation being used by the user to traverse a given path (e.g., from home to work) and can select either a first point of interest or a second point of interest based on the current mode of transportation. Specifically, a first point of interest may be associated with a bicycle mode of transportation and a second point of interest may be associated with a car or train mode of transportation. In response to determining that the mode of transportation used by the user currently to traverse the path that traverses the geofence that includes the first and second points of interest includes a bicycle, the travel notification system 124 selects the first point of interest for which to trigger an advertisement for presentation to the user.

The travel notification system 124 determines from historical paths traversed by a given user an approximate time the user normally begins a journey along the path. For example, the travel notification system 124 determines that every weekday the user leaves their home at an approximate time of 8 AM (e.g., between 7:50 AM and 8:10 AM) to travel along a path to work. The travel notification system 124 determines that on a current weekday, the current time is 7:30 AM, which is less than a threshold (e.g., 30 minutes) from the approximate time of 8 AM when the user normally leaves for work from their home. In response, the travel notification system 124 triggers generation of a notification with an advertisement for a point of interest traversed by the path from the user's home to work for provision and display to the user before the current time reaches the approximate time of 8 AM at which point the user will leave for work.

As another example, the travel notification system 124 determines how long it takes the user to traverse from one geofence to another geofence along the path from home to work. Specifically, the travel notification system 124 estimates how long the user will take, while traveling along the path from home to work, to reach a given geofence along the path. The travel notification system 124 retrieves a threshold (e.g., 10 minutes) and generates a notification with an advertisement for the point of interest in the given geofence in response to determining that the estimated amount of time to reach the given geofence from the current location of the user is less than the threshold. In this way, the travel notification system 124 notifies the user about the point of interest just prior to the user reaching the geofence in which the point of interest is located.

In some embodiments, the threshold amount of time to reach the point of interest for triggering the notification is dynamically adjusted based on a total duration of the path traversed by the user. For example, if the path from the user's home to work normally takes the user a total duration of 30 minutes to complete, the threshold amount for triggering a notification for a point of interest along the path is computed to be 5 minutes. Alternatively, if the path from the user's home to work normally takes the user a total duration of 1 hour to complete, the threshold amount for triggering a notification for a point of interest along the path is computed to be 25 minutes. In some embodiments, the travel notification system 124 adjusts the threshold amount of time based on a predicted speed of travel along the path. For example, if the travel notification system 124 predicts the user's speed along the path from the user's home to work to be 66 MPH, the threshold amount for triggering a notification for a point of interest along the path is computed to be 5 minutes. Alternatively, if the travel notification system 124 predicts the user's speed along the path from the user's home to work to be 100 MPH, the threshold amount for triggering a notification for a point of interest along the path is computed to be 5 minutes.

In some embodiments, travel notification system 124 identifies a list of geofences in a plurality of geofences that are traversed by a train mode of transportation while the train is moving. The travel notification system 124 determines that the current mode of transportation of the user being used to traverse a given geofence in the plurality of geofences includes the train. The travel notification system 124 applies the trained machine learning model to predict that the user will traverse the given geofence based on the current time and location of the user. The travel notification system 124 determines that the given geofence is included in a list of geofences that are traversed by the train mode of transportation. In response, the travel notification system 124 prevents notifying the user about the point of interest enclosed by the given geofence. Namely, the travel notification system 124 may prevent notifying users about points of interest that are located along paths traversed by the users while the users are on a moving train. The travel notification system 124 may include points of interest around train stations where the train stops moving to drop off and pick up passengers.

In some embodiments, the travel notification system 124 accesses the messaging client application 104 to form a relationship between users that are within a threshold distance of each other while traveling on the same paths at the same times. For example, the travel notification system 124 may determine that two users are within a threshold distance of each other (e.g., less than 5 feet) while the users were traveling along the same path or sequence of locations during a common time interval (e.g., between 8 AM and 9 AM). The travel notification system 124 may also determine that the two users are connected to each other (e.g., are friends) on the messaging client application 104. In response, the travel notification system 124 may determine that the two users are coworkers and/or family members. In such cases, the travel notification system 124 may determine that the two users are carpooling and selects different notifications for presentation to the users that are carpooling than for users that are traveling alone. The travel notification system 124 may present the same notification with the same advertisement at the same time to both users.

Figure 2:
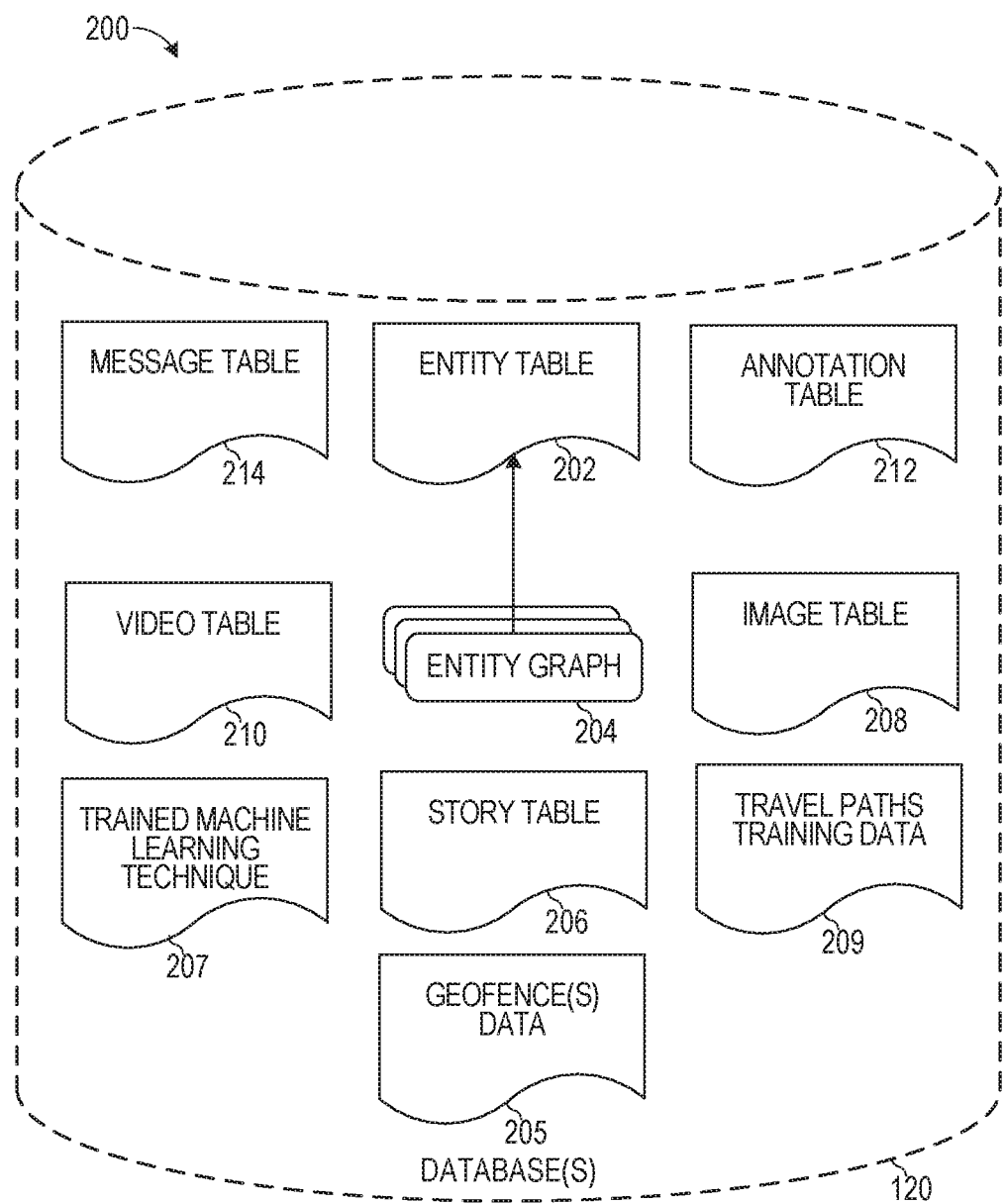
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Trained machine learning technique(s) 207 stores parameters that have been trained during training of the travel notification system 124. For example, trained machine learning techniques 207 stores the trained parameters of a neural network machine learning technique.

Travel paths training data 209 stores a plurality of paths taken by different users, times during which such paths were taken, and/or geofences traversed by each of the paths. These travel paths training data 209 are used by the travel notification system 124 to train the machine learning techniques used to predict a geofence that will be traversed by a user in the future based on the user's current location and current time. As an example, the travel notification system 124 may generate a first path for a first user in response to determining that the first user has left a first location at which the user was previously for a threshold period of time (e.g., more than 2 hours) and has reached a second location where the user remained for more than another threshold period of time (e.g., more than 1 hour). The travel notification system 124 may store a time period during which the first path was traversed by the first user in the travel paths training data 209. The travel notification system 124 may generate a second path for the first user in response to determining that the first user has left a third location at which the user was previously for a threshold period of time (e.g., more than 2 hours) and has reached a fourth location where the user remained for more than another threshold period of time (e.g., more than 1 hour). The travel notification system 124 may store a time period during which the second path was traversed by the first user in the travel paths training data 209. The travel notification system 124 may generate such paths for multiple users of a messaging client application 104.

Geofence(s) data 205 stores data that defines boundaries on a map based on shapes that each encloses one or more respective points of interest (e.g., a restaurant, a park, an amusement park, a commercial establishment, a shopping mall, a sporting event venue, a park, a beach, a scenic area, and/or a movie theater). The shapes can be of various types (e.g., rectangles, squares, triangles, polygons and so forth). The geofence(s) data 205 stores such shapes in response to receiving input from an entity associated with a given point of interest that draws or defines the shape surrounding the point of interest. A geofence is traversed or crossed by a navigation path when a location or point along the navigation path falls within the boundaries of the geofence. The geofence(s) data 205 stores parameters of each point of interest and/or geofence boundary. The parameters define when a given point of interest triggers an advertisement to present to a user, the content of the advertisement (e.g., based on whether a user is traveling alone, with a coworker, and/or with a family member), and/or the transportation mode used to traverse the geofence. The geofence(s) data 205 also includes a list of points that are traversed by a moving train and non-moving train.

Returning to FIG. 2, a story table 206 stores data regarding collections of messages and associated images, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
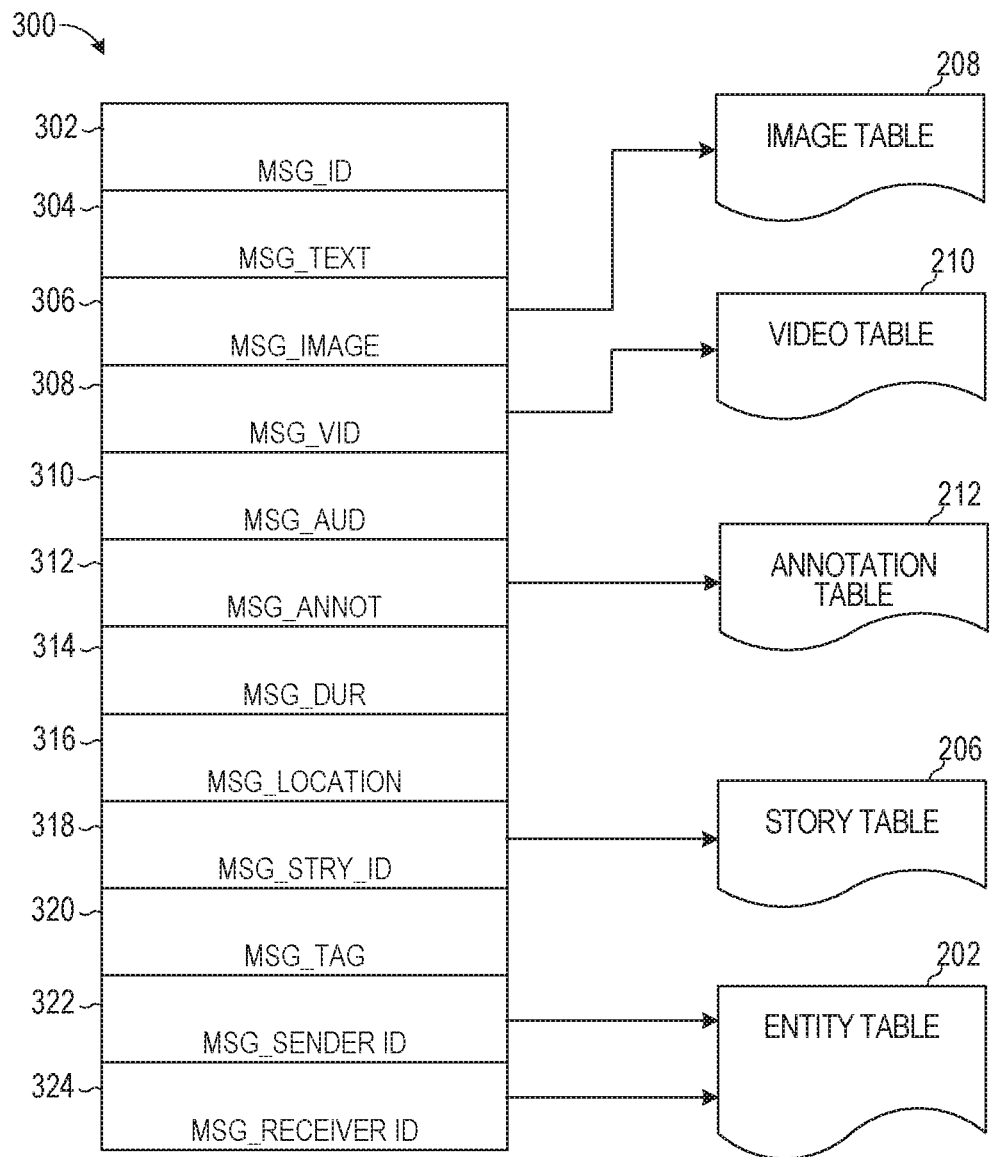
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

- A message duration parameter 314: parameter value indicating, in seconds, the amount of time for which content of the message (e.g., the message image payload 306, message video payload 308, message audio payload 310) is to be presented or made accessible to a user via the messaging client application 104.
- A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).
- A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.
- A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.
- A message sender identifier 322: an identifier (e.g., a messaging system identifier, email address, or device identifier) indicative of a user of the client device 102 on which the message 300 was generated and from which the message 300 was sent.
- A message receiver identifier 324: an identifier (e.g., a messaging system identifier, email address, or device identifier) indicative of user(s) of the client device 102 to which the message 300 is addressed. In the case of a conversation between multiple users, the identifier 324 may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
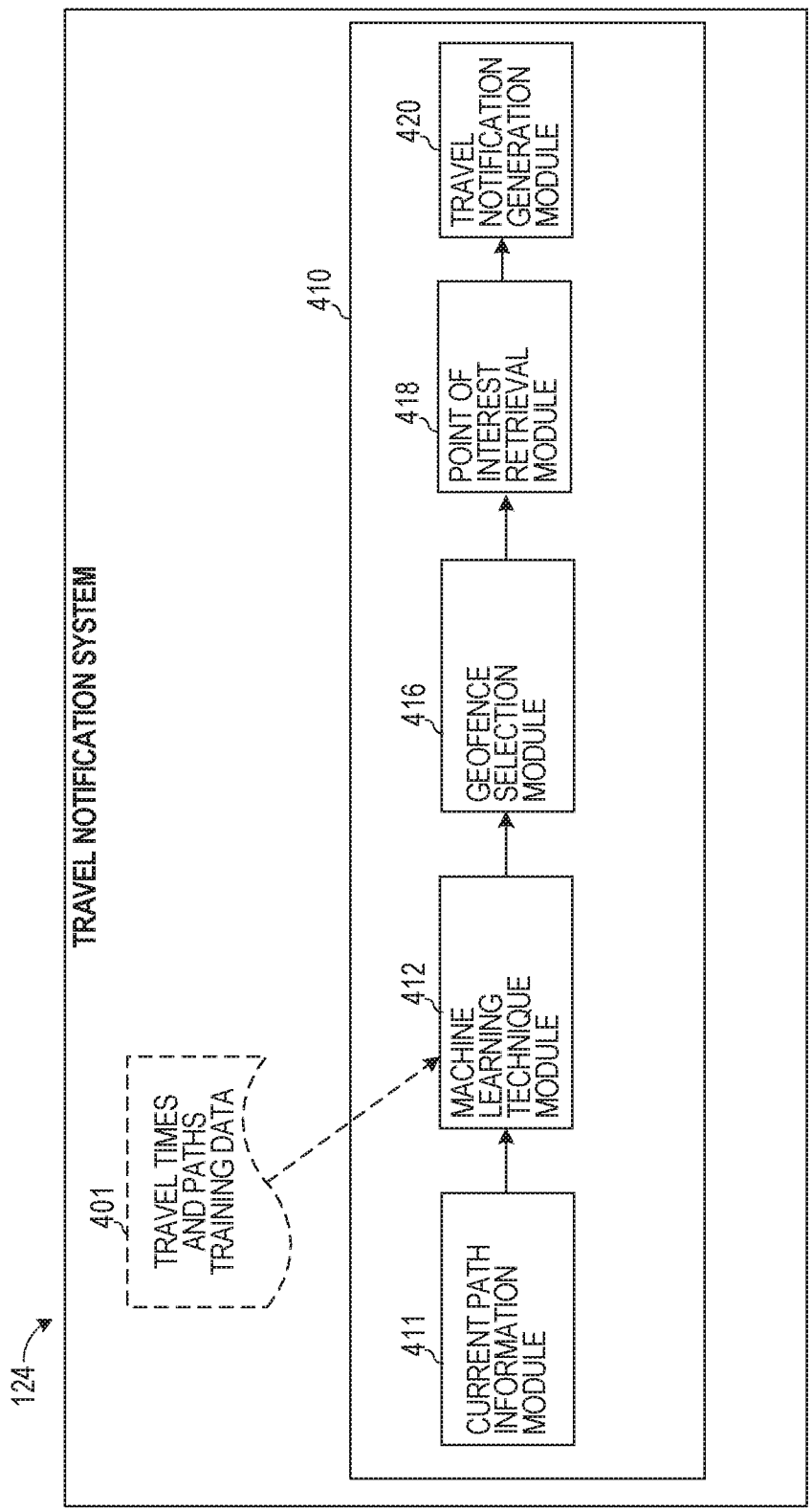
FIG. 4 is a block diagram showing an example travel notification system, according to example embodiments.

FIG. 4 is a block diagram showing an example travel notification system 124, according to example embodiments. Travel notification system 124 operates on a set of input data (e.g., travel times and paths training data 401). The set of input data is obtained from travel paths training data 209 stored in database(s) 200 during the training phases and is obtained from a location sensor (e.g., a GPS device) of a client device 102. Travel notification system 124 includes a machine learning technique module 412, current path information module 411, geofence selection module 416, point of interest retrieval module 418, and travel notification generation module 420.

In some embodiments, the machine learning technique module 412 implements a machine learning (ML) algorithm or model. ML algorithms or ML models or techniques can be summarized as function approximation. Training data consisting of input-output pairs of some type (e.g., paths traversed by users at particular times or time intervals and geofences traversed by those respective paths) are acquired and a function is "trained" to approximate this mapping (e.g., from the timing of when paths are traversed to the list of geofences traversed by the paths). Some methods involve NNs. In these, a set of parametrized functions $A_\theta$ are selected, where $\theta$ is a set of parameters e.g., convolution kernels and biases) that are selected by minimizing the average error over the training data. If the input-output pairs are denoted by $(x_m, y_m)$, the function can be formalized by solving a minimization problem such as:

$$\min_\theta \sum_{m=1}^{M} \| A_\theta(x_m) - y_m \|^2$$

Once the network has been trained (e.g., $\theta$ has been selected), the function $A_\theta$ can be applied to any new input. For example, a never-before-seen navigation path, location, and/or time of a given user can be fed into $A_\theta$, and a set of geofences are predicted that will be traversed by a given path that will be travelled by the given user within a certain time in the future.

Simple NNs consist of an input layer, a middle or hidden layer, and an output layer, each containing computational units or nodes. The hidden layer(s) nodes have input from all the input layer nodes and are connected to all nodes in the output layer. Such a network is termed "fully connected." Each node communicates a signal to the output node depending on a nonlinear function of the sum of its inputs. For a classifier, the number of input layer nodes typically equals the number of features for each of a set of objects being sorted into classes, and the number of output layer nodes is equal to the number of classes. A network is trained by presenting it with the features of objects of known classes and adjusting the node weights to reduce the training error by an algorithm called backpropagation. Thus, the trained network can classify novel objects whose class is unknown.

In some embodiments, the machine learning technique module 412 implements a neural network. Neural networks have the capacity to discover relationships between the data and classes or regression values, and under certain conditions, can emulate any function $y=f(x)$ including non-linear functions. In ML, an assumption is that the training and test data are both generated by the same data-generating process, $p_{data}$, in which each $\{x_i, y_i\}$ sample is identically and independently distributed (i.i.d.). In ML, the goals are to minimize the training error and to make the difference between the training and test errors as small as possible. Underfitting occurs if the training error is too large; overfitting occurs when the train-test error gap is too large. Both types of performance deficiency are related to model capacity: large capacity may fit the training data very well but lead to overfitting, while small capacity may lead to underfitting.

During training, according to the disclosed embodiments, travel notification system 124 receives a given navigation path of a given user and a travel time or travel duration of the given navigation path from travel times and one or more geofences traversed by the travel times and paths training data 401. The travel notification system 124 applies one or more machine learning techniques using machine learning technique module 412 on the given navigation path of a given user and a travel time or travel duration of the given navigation path. The machine learning technique module 412 extracts one or more features from the given training data to estimate one or more geofences traversed by the paths.

The machine learning technique module 412 compares the estimated one or more geofences traversed by the paths with ground geofences provided as part of the training data 401. Based on a difference threshold of the comparison, the machine learning technique module 412 updates one or more coefficients and obtains one or more additional training paths and training geofences. After a specified number of epochs or training navigation paths have been processed and/or when the difference threshold reaches a specified value, the machine learning technique module 412 completes training and the parameters and coefficients of the machine learning technique module 412 are stored in trained machine learning technique(s) 207.

After training, according to the disclosed embodiments, travel notification system 124 receives a current location and current time of a given user from a client device 102. The travel notification system 124 applies the trained machine learning technique module 412 to the received current location and current time of the given user to predict one or more geofences that will be traversed by the given user in the future.

In some embodiments, the machine learning technique module 412 is trained to predict a mode of transportation a user will take to travel along a given path, a speed of travel along the path, and/or one or more users that will join the user in traveling along the path in a similar manner.

Current path information module 411 receives location information and a current time from one or more client device 102. The current path information module 411 may generate a path using the location information by analyzing how long a user spends at a particular location before leaving for another location. The current path information module 411 may determine that a given user has spent more than a threshold period of time (e.g., more than 2 hours) at home and has traveled a certain distance to reach work and stay at work for another threshold period of time (e.g., more than 1 hour). The current path information module 411 aggregates all of the locations traversed by the user between the time the user left home and the time the user arrived at work to form a single navigation path. The current path information module 411 may also identify a list of geofences that are traversed by the path and store this information as the travel times and paths training data 401.

The current path information module 411 may determine that a given user is friends with another user on the messaging client application 104. The current path information module 411 may determine that both users traversed the same path at the same time and were within a threshold distance of each other during the time they traversed the path. In response, the current path information module 411 may also store an association between the two users as traveling together. The current path information module 411 may access social network information for the two users to determine whether the two users are family members or coworkers.

At a future time, the current path information module 411 may determine the current time and the current location for a given user. The current path information module 411 may provide the current time and the current location to the machine learning technique module 412. The machine learning technique module 412 applies a trained machine learning technique or model to the current time and the current location of the given user. The machine learning technique module 412 predicts a path that will be traversed by the user and a list of geofences that will be traversed by the user on the path in the future. The machine learning technique module 412 may identify the times in the future when the given user will likely traverse each of the geofences in the list. The machine learning technique module 412 provides the list of geofences to the geofence selection module 416.

The geofence selection module 416 retrieves a user profile of the given user from which the current location and time was received by the current path information module 411. The geofence selection module 416 may identify which of the points of interest in each of the geofences in the list of geofences matches interests of the user stored in the user profile. The geofence selection module 416 selects one or more geofences from the list of geofences. In some cases, the geofence selection module 416 may determine a mode of transportation being used or that will be used by the user to traverse the predicted path. The geofence selection module 416 obtains parameters of the one or more geofences to identify a subset of geofences that match the mode of transportation that is determined. For example, if the mode of transportation is a bicycle, the geofence selection module 416 identifies a subset of geofences for which the parameters indicated are suitable for a bicycle mode of transportation and excludes from the subset geofences for which the parameters indicate are suitable for car or motorized vehicle mode of transportation. As another example, the geofence selection module 416 may determine that the current mode of transportation includes a train and may exclude from the subset of geofences any geofence that is traversed by the path when the train is moving. This prevents a notification or advertisement from being presented to the user traveling along the predicted path while the user is on a moving train. The geofence selection module 416 provides the subset of geofences to the point of interest retrieval module 418.

In some embodiments, geofence selection module 416 presents a graphical map-based user interface to a commercial entity for generating one or more geofences. For example, a restaurant owner may access the geofence selection module 416 and, for a subscription fee or for a nominal or no fee, view a graphical map-based user interface. The geofence selection module 416 receives input from the restaurant owner that draws a circle, rectangle, triangle, or other suitable shape around the restaurant owned by the restaurant owner. In an embodiment, the geofence selection module 416 limits the restaurant owner to drawing a shape that is less than a threshold size (e.g., the shape is limited to covering less than 1 acre of land on the map). In some embodiments, the threshold size can be dynamically increased in response to the restaurant owner selecting an option that upgrades their access to the map-based graphical user interface. In some cases, the option to upgrade is presented to the restaurant owner for an increased fee.

After the restaurant owner draws the shape, the restaurant owner can input a name of the point of interest (e.g., the restaurant) and can supply an advertisement for the point of interest. In some cases, the restaurant owner can input various parameters for the advertisement for triggering different advertisement presentations to users depending on who the users are traveling with. In some embodiments, the restaurant owner can specify among the parameters for triggering and selecting advertisements a mode of transportation being used to reach the point of interest. In some cases, the restaurant owner can require a specific mode of transportation for triggering a given advertisement. In this way, the geofence selection module 416 can store associations between different points of interest within the same or different geofence with different modes of transportation.

Point of interest retrieval module 418 obtains one or more points of interest for each of the subset of geofences. The point of interest retrieval module 418 can randomly or pseudo-randomly select one of the points of interest of one of the geofences in the subset. The point of interest retrieval module 418 retrieves an advertisement for the selected point of interest. In some cases, the point of interest retrieval module 418 may receive information from the current path information module 411 indicating whether the given user is traveling alone, with a coworker, or with a family member along the predicted path. Based on this information, the point of interest retrieval module 418 selects a particular advertisement associated with matching parameters.

Figure 6:
FIGS. 6-8 are illustrative inputs and outputs of the travel notification system, according to example embodiments.
Figure 7:
Figure 8:

For example, if the point of interest retrieval module 418 determines that the user is traveling alone along the predicted path, the point of interest retrieval module 418 may select a first advertisement for the selected point of interest that is suitable for a user traveling alone. Such an advertisement is shown and described in connection with FIG. 6. If the point of interest retrieval module 418 determines that the user is traveling with a coworker along the predicted path, the point of interest retrieval module 418 may select a second advertisement, having different content than the first advertisement, for the selected point of interest that is suitable for a user traveling with a coworker. Such an advertisement is shown and described in connection with FIG. 7. If the point of interest retrieval module 418 determines that the user is traveling with a family member along the predicted path, the point of interest retrieval module 418 may select a third advertisement, having different content than the first and second advertisements, for the selected point of interest that is suitable for a user traveling with a family member. Such an advertisement is shown and described in connection with FIG. 8.

Point of interest retrieval module 418 provides the selected advertisement for the point of interest to the travel notification generation module 420. Travel notification generation module 420 triggers presentation of the notification with the advertisement to the given user and/or any other users (e.g., coworkers or family members) traveling with the user along the predicted path within a threshold period of time before the user reaches the geofence that includes the point of interest.

Travel notification generation module 420 may generate and display a notification with an advertisement about the point of interest to the user at a predetermined period of time, such as 5 minutes before the user leaves their home to go to work along the predicted navigation path that traverses the point of interest. For example, the travel notification generation module 420 determines that every weekday the user leaves their home at an approximate time of 8 AM (e.g., between 7:50 AM and 8:10 AM) to travel along a path to work based on an output of the machine learning technique module 412. The travel notification generation module 420 determines that on a current weekday, the current time is 7:30 AM. The travel notification generation module 420 retrieves a threshold for triggering a notification (e.g., 30 minutes prior to starting to travel along a predicted path). The travel notification generation module 420 computes a difference between the approximated time of 8 AM and the current time of 7:30 AM and compares that difference to the threshold. In response to determining that the difference is less than the threshold, the travel notification generation module 420 triggers generation of a notification with an advertisement for the point of interest traversed by the predicted path before the current time reaches the approximate time of 8 AM, at which point the user will leave for work. The notification may be presented to the user on a graphical user interface of the messaging client application 104 and/or on a display of the client device 102. In some embodiments, the travel notification generation module 420 may determine that the user will be traveling along the predicted route with another user and that the two users are connected on a social network or on the messaging client application 104. In such cases, the notification is presented simultaneously on respective user devices of the two users.

In some embodiments, the travel notification generation module 420 generates for display to the user(s) the notification, without receiving user input, such as by presenting a prompt or overlay on the user's device. The notification may be presented while the user is traversing or traveling along the predicted navigation path to the destination. Namely, the notification may be presented after the user starts traveling along the path but before the user reaches or traverses the geofence that encloses the point of interest. In such cases, the travel notification generation module 420 retrieves a threshold period of time (e.g., 5 minutes) for presenting a notification before the user reaches a geofence. The travel notification generation module 420 predicts (e.g., based on a current distance to the point of interest or geofence and a current travel speed of the user or based on a predicted speed provided by the machine learning technique module 412) how long until the user reaches the geofence that encloses the point of interest. The travel notification generation module 420 compares the amount of time until the user reaches the geofence to the threshold, and in response to determining that the amount of time is less than the threshold, the travel notification generation module 420 triggers the notification for display. In some embodiments, the travel notification generation module 420 may determine that the user will be traveling along the predicted route with another user and that the two users are connected on a social network or on the messaging client application 104. In such cases, the notification is presented simultaneously on respective user devices of the two users.

The threshold may be adjusted based on the predicted speed of the user and/or based on a total expected duration of the predicted path.

Figure 5:
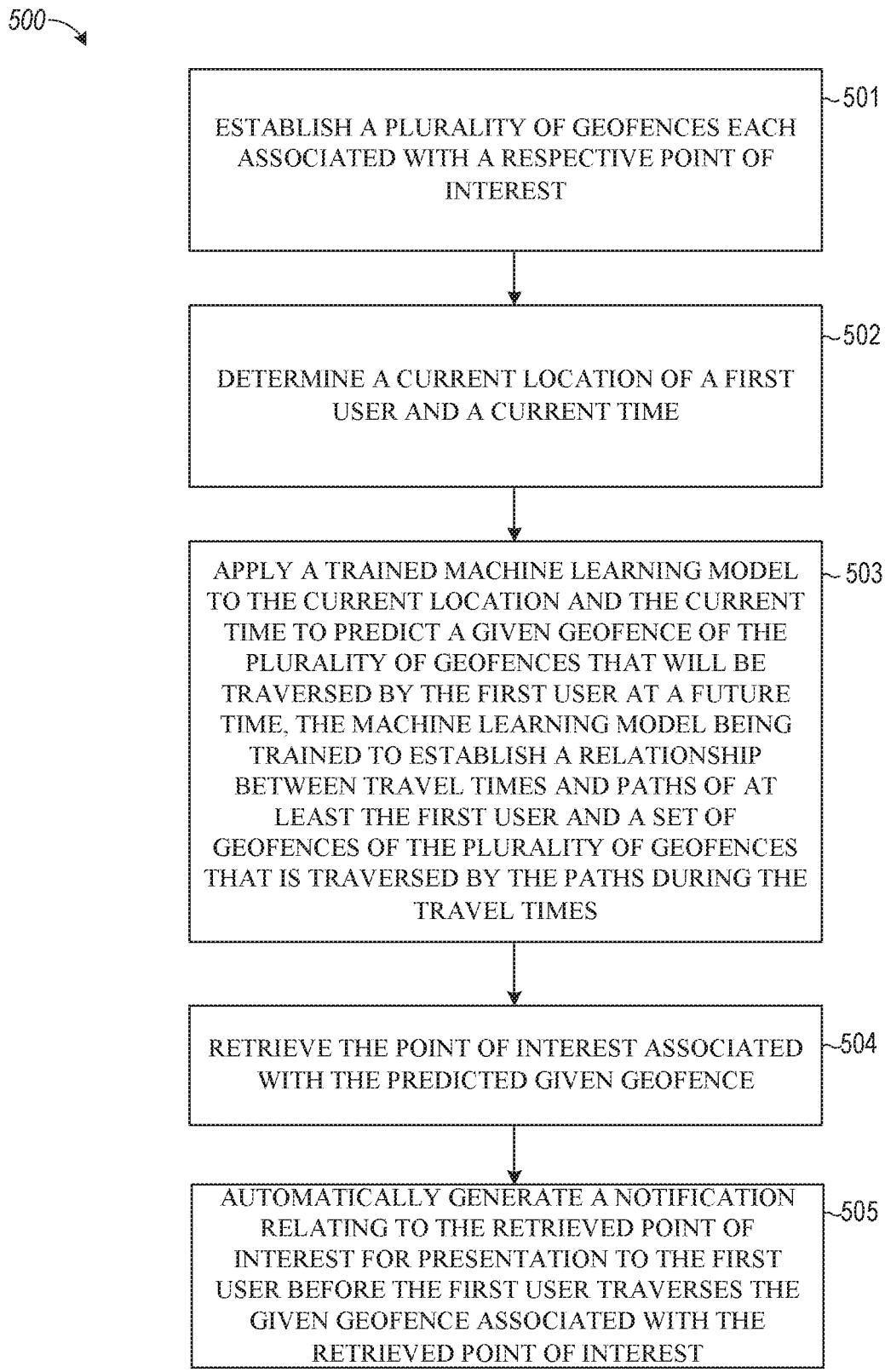
FIG. 5 is a flowchart illustrating example operations of the travel notification system, according to example embodiments.

FIG. 5 is a flowchart illustrating example operations of the travel notification system 124 in performing process 500, according to example embodiments. The process 500 may be embodied in computer-readable instructions for execution by one or more processors such that the operations of the process 500 may be performed in part or in whole by the functional components of the messaging server system 108; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the travel notification system 124 establishes a plurality of geofences each associated with a respective point of interest.

At operation 502, the travel notification system 124 determines a current location of a first user and a current time.

At operation 503, the travel notification system 124 applies a trained machine learning model to the current location and the current time to predict a given geofence of the plurality of geofences that will be traversed by the first user at a future time, the machine learning model being trained to establish a relationship between travel times and paths of at least the first user and a set of geofences of the plurality of geofences that is traversed by the paths during the travel times.

At operation 504, the travel notification system 124 retrieves the point of interest associated with the predicted given geofence.

At operation 505, the travel notification system 124 automatically generates a notification relating to the retrieved point of interest for presentation to the first user before the first user traverses the given geofence associated with the retrieved point of interest.

Figure 9:
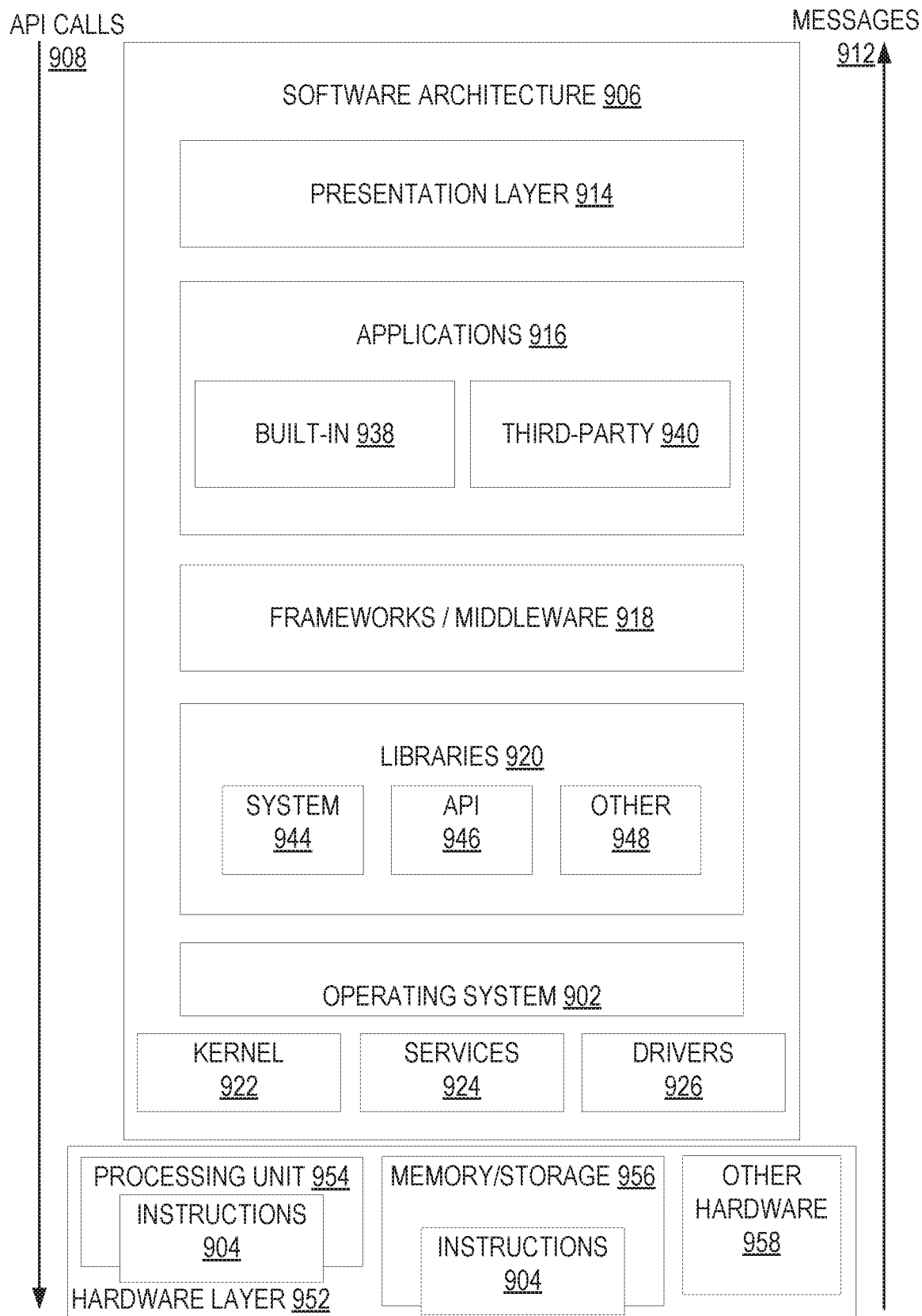
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
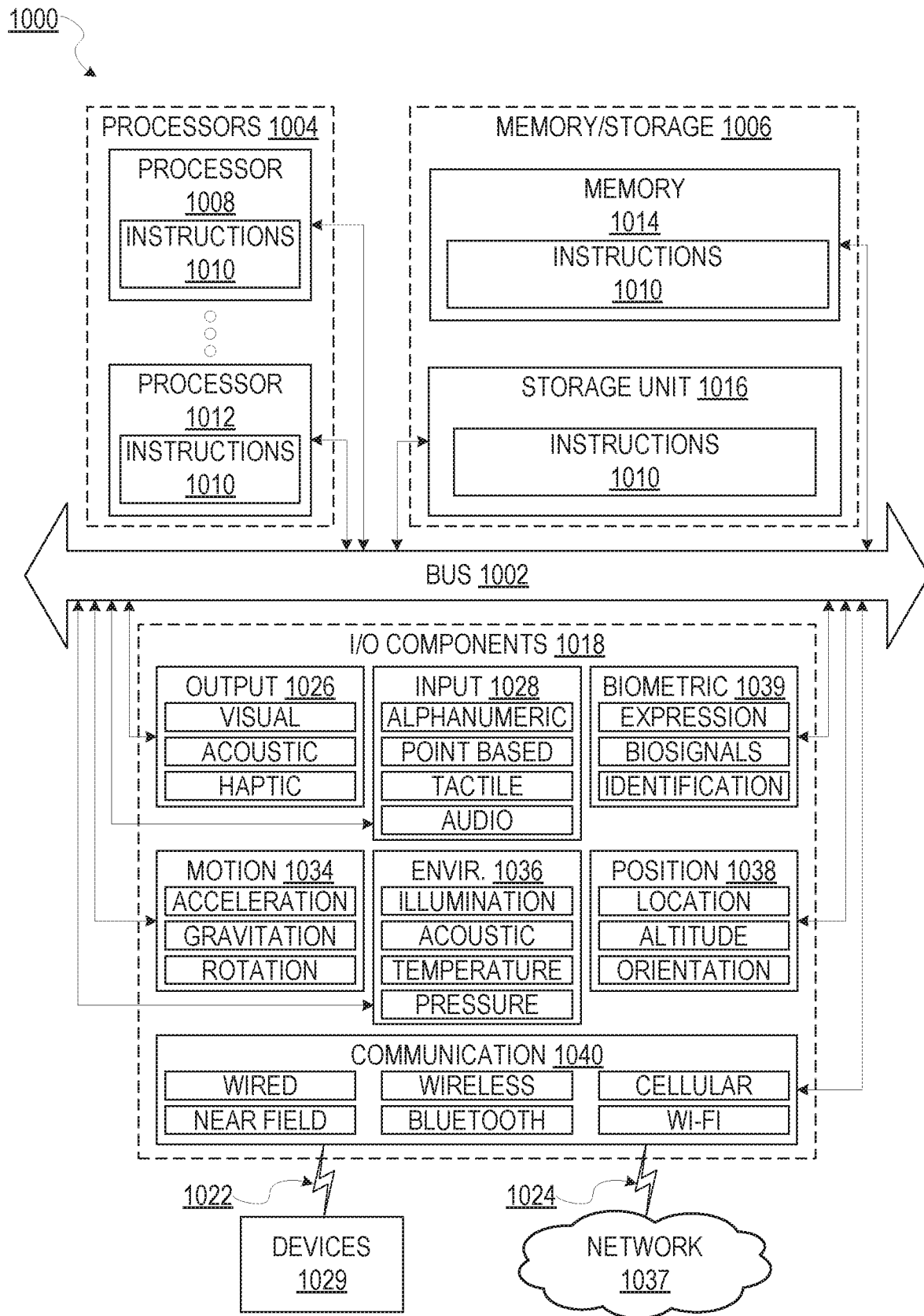
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary:

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
receiving input that draws a given geofence, of a plurality of geofences, on a map around a point of interest;

in response to receiving the input, establishing, by one or more processors, the plurality of geofences each associated with a respective point of interest;

determining, by the one or more processors, a current location of a first user and a current time;

applying, by the one or more processors, a trained machine learning model to the current location and the current time to predict a given geofence of the plurality of geofences that will be traversed by the first user at a future time, the machine learning model trained to establish a relationship between travel times and paths of at least the first user and a set of geofences of the plurality of geofences that is traversed by the paths during the travel times, the trained machine learning model trained by performing training operations comprising:

accessing a set of training data comprising a given navigation path of a given user, a travel time of the given navigation path and one or more geofences associated with the given navigation path at the travel times;

applying a neural network to the set of training data to extract one or more features from the set of training data;

estimating, by the neural network, one or more geofences traversed by the given navigation path of the set of training data;

computing a difference between the estimated one or more geofences and the one or more geofences associated with the given navigation path of the set of training data; and updating parameters of the neural network based on the difference;

retrieving, by the one or more processors, the point of interest associated with the predicted given geofence;

determining that the first user has remained at the current location for at least a threshold period of time;

determining that a first amount of time between when the first user was at a first geofence of the plurality of geofences and when the first user has left the first geofence transgresses a threshold value;

determining that a second amount of time between when the first user has been determined to be at a second geofence of the plurality of geofences, after being at the first geofence, and when the first user has left the second geofence transgresses the threshold value;

in response to determining that the first amount of time transgresses the threshold and in response to determining that the second amount transgresses the threshold value, generating an individual navigation path that includes a plurality of points of interest between the first and second geofences in response to determining that the first user has remained at the current location for at least the threshold period of time, estimating a future time when the first user will leave the current location to travel to the given geofence; and automatically generating, by the one or more processors, a notification relating to the retrieved point of interest for presentation to the first user before the future time when the first user will leave the current location to travel to the given geofence to traverse the given geofence associated with the retrieved point of interest along the individual navigation path.

2. The method of claim 1, comprising causing presentation of a graphical user interface comprising the map on a merchant device.

3. The method of claim 2, further comprising:
receiving input from the merchant device that draws a shape on the map around an establishment of the merchant, the shape being smaller than a first threshold size;
receiving a selection of an option to upgrade access to the graphical user interface; and
in response to receiving the selection of the option, enabling the merchant device to increase a size of the shape beyond the first threshold size up to a second threshold size.

4. The method of claim 1, wherein determining the current location and current time comprises identifying, without receiving navigation directions from the first user, a path for the first user that traverses the given geofence based on a historical set of paths traversed by the first user from the current location at a time corresponding to the current time.

5. The method of claim 4, further comprising:
determining, from the historical set of paths, an approximate time the first user leaves a home to begin a journey along the path;
determining that the current time is less than a threshold amount of time of the approximate time; and
in response to determining that the current time is less than the threshold amount of time of the approximate time, providing the generated notification to the first user prior to the current time reaching the approximate time when the first user will start traversing the path.

6. The method of claim 1, further comprising:
determining a threshold amount of time for generating the notification;
estimating an amount of time to reach the given geofence from the current location; and
generating the notification in response to determining that the estimated amount of time is less than the threshold amount of time.

7. The method of claim 6, wherein the threshold amount of time for generating the notification is adjusted based on a total duration of a path from a starting location to an ending location that traverses the given geofence.

8. The method of claim 7, further comprising:
computing a first value for the threshold amount of time in response to determining that the total duration of the path is a first amount; and
computing a second value for the threshold amount of time in response to determining that the total duration of the path is a second amount, wherein the first value and the first amount are greater than the second value and the second amount.

9. The method of claim 6, wherein the threshold amount of time for generating the notification is adjusted based on a predicted speed of travel along a path from a starting location to an ending location that traverses the given geofence.

10. The method of claim 9, further comprising:
computing a first value for the threshold amount of time in response to determining that the predicted speed of travel is a first amount; and
computing a second value for the threshold amount of time in response to determining that the predicted speed of travel is a second amount, wherein the first value and the first amount are greater than the second value and the second amount.

11. The method of claim 1, further comprising:
associating a first point of interest with the given geofence and a first mode of transportation;
associating a second point of interest with the given geofence and a second mode of transportation;

determining a current mode of transportation of the first user; and selecting, as the retrieved point of interest, either the first point of interest or the second point of interest based on the current mode of transportation of the first user.

12. The method of claim 1, further comprising training the machine learning model to predict a mode of transportation the first user will take at a future time to traverse the predicted given geofence and to predict one or more users that will join the first user.

13. The method of claim 1, further comprising:
identifying a list of geofences in the plurality of geofences that are traversed by a train mode of transportation while the train is moving;
determining that a current mode of transportation of the first user includes the train;
applying the trained machine learning model to the current location and the current time to predict the second geofence of the plurality of geofences that will be traversed by the first user at a second future time, the second geofence being associated with a second point of interest;
determining that the second geofence is included in the list of geofences that are traversed by the train mode of transportation; and
in response to determining that the current mode of transportation of the first user includes the train and that the second geofence is included in the list of geofences that are traversed by the train mode of transportation, preventing notifying the first user about the second point of interest.

14. The method of claim 1, wherein the notification is a first notification customized for an individual user visiting the retrieved point of interest, further comprising:
determining a path traversed by the first user based on the current location and the current time;
predicting that a second user will traverse the path together with the first user based on determining that the second user was within a threshold distance of the first user when the first user previously traversed the path;
selecting a second notification relating to the retrieved point of interest for presentation to the first user and the second user, the different notification being customized for a group of users visiting the point of interest; and
simultaneously presenting the second notification on a first client device associated with the first user and on a second client device associated with the second user in response to predicting that the second user will traverse the path together with the first user.

15. The method of claim 14, wherein:
the second notification includes a first type of content in response to determining that the first and second users are part of a same family; and
the second notification includes a second type of content, different from the first type of content, in response to determining that the first and second users are coworkers.

16. The method of claim 1, further comprising:
determining a mode of transportation for the first user; and
selecting an advertisement from a plurality of advertisements for the point of interest for inclusion in the notification based on the mode of transportation of the first user, such that a first advertisement is included in the notification in response to determining that the mode of transportation is a first type and a second advertisement is included in the notification in response to determining that the mode of transportation is a second type.

17. A system comprising:
a processor coupled to a memory that stores instructions that, when executed by the processor, cause the processor to perform operations comprising:
receiving input that draws a given geofence, of a plurality of geofences, on a map around a point of interest;
in response to receiving the input, establishing the plurality of geofences each associated with a respective point of interest;
determining a current location of a first user and a current time;
applying a trained machine learning model to the current location and the current time to predict a given geofence of the plurality of geofences that will be traversed by the first user at a future time, the machine learning model being trained to establish a relationship between travel times and paths of at least the first user and a set of geofences of the plurality of geofences that is traversed by the paths during the travel times, the trained machine learning model being trained by performing training operations comprising:
accessing a set of training data comprising a given navigation path of a given user, a travel time of the given navigation path and one or more geofences associated with the given navigation path at the travel times;
applying a neural network to the set of training data to extract one or more features from the set of training data;
estimating, by the neural network, one or more geofences traversed by the given navigation path of the set of training data;
computing a difference between the estimated one or more geofences and the one or more geofences associated with the given navigation path of the set of training data; and
updating parameters of the neural network based on the difference;
retrieving the point of interest associated with the predicted given geofence;
determining that the first user has remained at the current location for at least a threshold period of time;
determining that a first amount of time between when the first user was at a first geofence of the plurality of geofences and when the first user has left the first geofence transgresses a threshold value;
determining that a second amount of time between when the first user has been determined to be at a second geofence of the plurality of geofences, after being at the first geofence, and when the first user has left the second geofence transgresses the threshold value;
in response to determining that the first amount of time transgresses the threshold and in response to determining that the second amount transgresses the threshold value, generating an individual navigation path that includes a plurality of points of interest between the first and second geofences
in response to determining that the first user has remained at the current location for at least the threshold period of time, estimating a future time when the first user will leave the current location to travel to the given geofence; and
automatically generating, by the one or more processors, a notification relating to the retrieved point of interest for presentation to the first user before the future time when the first user will leave the current location to travel to the given geofence to traverse the given geofence associated with the retrieved point of interest along the individual navigation path.

18. The system of claim 17, the operations comprising:
determining a threshold amount of time for generating the notification;
estimating an amount of time to reach the given geofence from the current location; and
generating the notification in response to determining that the estimated amount of time is less than the threshold amount of time.

19. The system of claim 17, the operations further comprising:
determining a threshold amount of time for generating the notification;
estimating an amount of time to reach the given geofence from the current location; and
generating the notification in response to determining that the estimated amount of time is less than the threshold amount of time.

20. A non-transitory machine-readable storage medium that includes instructions that, when executed by one or more processors of a machine, cause the machine to perform operations comprising:
receiving input that draws a given geofence, of a plurality of geofences, on a map around a point of interest;
in response to receiving the input, establishing the plurality of geofences each associated with a respective point of interest;
determining a current location of a first user and a current time;
applying a trained machine learning model to the current location and the current time to predict a given geofence of the plurality of geofences that will be traversed by the first user at a future time, the machine learning model being trained to establish a relationship between travel times and paths of at least the first user and a set of geofences of the plurality of geofences that is traversed by the paths during the travel times, the trained machine learning model being trained by performing training operations comprising:
accessing a set of training data comprising a given navigation path of a given user, a travel time of the given navigation path and one or more geofences associated with the given navigation path at the travel times;
applying a neural network to the set of training data to extract one or more features from the set of training data;
estimating, by the neural network, one or more geofences traversed by the given navigation path of the set of training data;
computing a difference between the estimated one or more geofences and the one or more geofences associated with the given navigation path of the set of training data; and
updating parameters of the neural network based on the difference;
retrieving the point of interest associated with the predicted given geofence; and
determining that the first user has remained at the current location for at least a threshold period of time;
determining that a first amount of time between when the first user was at a first geofence of the plurality of geofences and when the first user has left the first geofence transgresses a threshold value;
determining that a second amount of time between when the first user has been determined to be at a second geofence of the plurality of geofences, after being at the first geofence, and when the first user has left the second geofence transgresses the threshold value;
in response to determining that the first amount of time transgresses the threshold and in response to determining that the second amount transgresses the threshold value, generating an individual navigation path that includes a plurality of points of interest between the first and second geofences
in response to determining that the first user has remained at the current location for at least the threshold period of time, estimating a future time when the first user will leave the current location to travel to the given geofence; and
automatically generating, by the one or more processors, a notification relating to the retrieved point of interest for presentation to the first user before the future time when the first user will leave the current location to travel to the given geofence to traverse the given geofence associated with the retrieved point of interest along the individual navigation path.

* * * * *